United States Patent
Koo

(10) Patent No.: US 10,285,240 B2
(45) Date of Patent: May 7, 2019

(54) LIGHT EMITTING DIODE (LED) DRIVING APPARATUS, LIGHTING APPARATUS, AND CURRENT CONTROL CIRCUIT

(71) Applicant: SAMSUNG ELECTRONICS CO., LTD., Suwon-si (KR)

(72) Inventor: Nam Su Koo, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 15/138,688

(22) Filed: Apr. 26, 2016

(65) Prior Publication Data

US 2017/0048935 A1   Feb. 16, 2017

(30) Foreign Application Priority Data

Aug. 12, 2015   (KR) .......................... 10-2015-0113898

(51) Int. Cl.
   *H05B 33/08* (2006.01)

(52) U.S. Cl.
   CPC ......... *H05B 33/089* (2013.01); *H05B 33/083* (2013.01); *H05B 33/0809* (2013.01); *H05B 33/0851* (2013.01); *H05B 33/0884* (2013.01); *H05B 33/0815* (2013.01)

(58) Field of Classification Search
   CPC .............. H05B 33/0815; H05B 33/089; H05B 33/0887; H05B 33/0809; H05B 33/0827; H05B 33/0812; H05B 33/083; H05B 33/0848; H05B 33/0851; H05B 33/0884
   See application file for complete search history.

(56) References Cited

U.S. PATENT DOCUMENTS

| | | | |
|---|---|---|---|
| 6,372,608 B1 | 4/2002 | Shimoda et al. |
| 6,645,830 B2 | 11/2003 | Shimoda et al. |
| RE38,466 E | 3/2004 | Inoue et al. |
| 6,818,465 B2 | 11/2004 | Biwa et al. |
| 6,818,530 B2 | 11/2004 | Shimoda et al. |
| 6,858,081 B2 | 2/2005 | Biwa et al. |
| 6,967,353 B2 | 11/2005 | Suzuki et al. |
| 7,002,182 B2 | 2/2006 | Okuyama et al. |
| 7,084,420 B2 | 8/2006 | Kim et al. |
| 7,087,932 B2 | 8/2006 | Okuyama et al. |

(Continued)

FOREIGN PATENT DOCUMENTS

KR   10-2007-0104804 A   10/2007
KR   10-2008-0083935 A   9/2008

(Continued)

*Primary Examiner* — Tung X Le
*Assistant Examiner* — Borna Alaeddini
(74) *Attorney, Agent, or Firm* — Sughrue Mion, PLLC

(57) ABSTRACT

An apparatus for driving a light emitting diode (LED) includes a current control circuit connected to an output terminal of a plurality of LEDs and configured to generate a first voltage based on a sensing voltage detected from the output terminal of the plurality of LEDs, the current control circuit including at least one comparator configured to control a current flowing in the plurality of LEDs based on a result of comparison between the first voltage and a reference voltage; and a protective circuit configured to block the current flowing in the plurality of LEDs by stopping an operation of the at least one comparator in response to an increase of the sensing voltage.

19 Claims, 13 Drawing Sheets

(56) References Cited

U.S. PATENT DOCUMENTS

| | | | |
|---|---|---|---|
| 7,154,124 B2 | 12/2006 | Han et al. | |
| 7,208,725 B2 | 4/2007 | Sherrer et al. | |
| 7,288,758 B2 | 10/2007 | Sherrer et al. | |
| 7,319,044 B2 | 1/2008 | Han et al. | |
| 7,501,656 B2 | 3/2009 | Han et al. | |
| 7,550,934 B1 * | 6/2009 | Deng | H05B 33/0887 315/209 R |
| 7,709,857 B2 | 5/2010 | Kim et al. | |
| 7,759,140 B2 | 7/2010 | Lee et al. | |
| 7,781,727 B2 | 8/2010 | Sherrer et al. | |
| 7,790,482 B2 | 9/2010 | Han et al. | |
| 7,940,350 B2 | 5/2011 | Jeong | |
| 7,959,312 B2 | 6/2011 | Yoo et al. | |
| 7,964,881 B2 | 6/2011 | Choi et al. | |
| 7,985,976 B2 | 7/2011 | Choi et al. | |
| 7,994,525 B2 | 8/2011 | Lee et al. | |
| 8,008,683 B2 | 8/2011 | Choi et al. | |
| 8,013,352 B2 | 9/2011 | Lee et al. | |
| 8,049,161 B2 | 11/2011 | Sherrer et al. | |
| 8,129,711 B2 | 3/2012 | Kang et al. | |
| 8,179,938 B2 | 5/2012 | Kim | |
| 8,263,987 B2 | 9/2012 | Choi et al. | |
| 8,324,646 B2 | 12/2012 | Lee et al. | |
| 8,399,944 B2 | 3/2013 | Kwak et al. | |
| 8,432,511 B2 | 4/2013 | Jeong | |
| 8,459,832 B2 | 6/2013 | Kim | |
| 8,502,242 B2 | 8/2013 | Kim | |
| 8,536,604 B2 | 9/2013 | Kwak et al. | |
| 8,735,931 B2 | 5/2014 | Han et al. | |
| 8,766,295 B2 | 7/2014 | Kim | |
| 9,265,107 B2 * | 2/2016 | Koo | H05B 33/0851 |
| 9,295,117 B2 * | 3/2016 | Acatrinei | H05B 33/0815 |
| 2005/0218963 A1 * | 10/2005 | Ball | H02M 1/08 327/427 |
| 2007/0247450 A1 | 10/2007 | Lee | |
| 2008/0284346 A1 | 11/2008 | Lee | |
| 2009/0096437 A1 * | 4/2009 | Wei | H02M 1/10 323/299 |
| 2009/0302776 A1 * | 12/2009 | Szczeszynski | H05B 33/0815 315/246 |
| 2010/0194285 A1 * | 8/2010 | Byun | G09G 3/3406 315/125 |
| 2010/0220507 A1 * | 9/2010 | Schroeder | H02M 1/32 363/126 |
| 2012/0013266 A1 | 1/2012 | Jeon et al. | |
| 2012/0049740 A1 * | 3/2012 | Kang | H05B 33/089 315/121 |
| 2012/0105498 A1 | 5/2012 | Kim et al. | |
| 2012/0286746 A1 * | 11/2012 | Martin | G01R 31/40 323/234 |
| 2013/0193864 A1 * | 8/2013 | Angeles | H05B 33/0842 315/210 |
| 2013/0293109 A1 | 11/2013 | Cheon et al. | |
| 2013/0313974 A1 * | 11/2013 | Fan | H05B 33/0815 315/127 |
| 2014/0203708 A1 * | 7/2014 | Ke | H05B 37/02 315/119 |
| 2014/0265844 A1 * | 9/2014 | Sadwick | H05B 33/0815 315/85 |
| 2015/0237689 A1 * | 8/2015 | Yang | H05B 33/0809 315/200 R |

FOREIGN PATENT DOCUMENTS

| | | |
|---|---|---|
| KR | 10-0867551 B1 | 11/2008 |
| KR | 10-1002600 B1 | 12/2010 |
| KR | 10-1043476 B1 | 6/2011 |
| KR | 10-2012-0010583 A | 2/2012 |
| KR | 10-2012-0044015 A | 5/2012 |
| KR | 10-2013-0123230 A | 11/2013 |

* cited by examiner

LIGHT EMITTING DIODE (LED) DRIVING APPARATUS, LIGHTING APPARATUS, AND CURRENT CONTROL CIRCUIT

CROSS-REFERENCE TO RELATED APPLICATION

This application claims priority from Korean Patent Application No. 10-2015-0113898, filed on Aug. 12, 2015, with the Korean Intellectual Property Office, the disclosure of which is incorporated herein in its entirety by reference.

BACKGROUND

Apparatuses consistent to exemplary embodiments relate to a light emitting diode (LED) driving apparatus, a lighting apparatus, and a current control circuit.

Semiconductor light emitting devices include elements such as light emitting diodes (LEDs) and the like. The use of semiconductor light emitting devices as light sources is gradually increasing due to features such as low power consumption, a high degree of brightness, extended lifespans, and the like. In particular, semiconductor light emitting devices have been widely used as light sources in automobile headlamps, automobile taillights, and the like.

In a case in which semiconductor light emitting devices are used as light sources in vehicle headlamps, vehicle taillights, and the like, maintaining a constant level of brightness of semiconductor light emitting devices in response to a change in levels of voltage of power supplied by vehicles is desirable. In addition, protective circuits are needed to protect semiconductor light emitting devices from overvoltage, short circuit current, or the like, that may occur due to abnormal operations of batteries or breakage of semiconductor light emitting devices.

SUMMARY

One or more exemplary embodiments provide a light emitting diode (LED) driving apparatus, a lighting apparatus, and a current control circuit capable of protecting a semiconductor light emitting device from an overvoltage current, a short circuit, or the like, and/or maintaining a constant level of brightness in a semiconductor light emitting device in response to variations in a level of an input voltage.

According to an aspect of an exemplary embodiment, there is provided an apparatus for driving a light emitting diode (LED), the apparatus including: a current control circuit connected to an output terminal of a plurality of LEDs and configured to generate a first voltage based on a sensing voltage detected from the output terminal of the plurality of LEDs, the current control circuit including at least one comparator configured to control a current flowing in the plurality of LEDs based on a result of comparison between the first voltage and a reference voltage; and a protective circuit configured to block the current flowing in the plurality of LEDs by stopping an operation of the at least one comparator in response to an increase of the sensing voltage.

According to an aspect of another exemplary embodiment, there is provided a lighting apparatus including: a light source including a plurality of LEDs operated by driving power supplied by an external power supply; a current control circuit including a switching element, connected to an output terminal of the plurality of LEDs, and at least one comparator configured to control an operation of the switching element, wherein the current control circuit is configured to adjust an average value of a current flowing in the plurality of LEDs by controlling a turn-on time and a turn-off time of the switching element; and a protective circuit configured to block the current flowing in the plurality of LEDs by stopping an operation of the at least one comparator in response to a sensing voltage detected from the output terminal of the plurality of LEDs being higher than a threshold voltage.

According to an aspect of still another exemplary embodiment, there is provided a current control circuit including: a switching element connected to an output terminal of a plurality of LEDs; an integrating circuit connected between the switching element and a ground terminal; and at least one comparator configured to control a current flowing in the plurality of LEDs by comparing a voltage output from the integrating circuit with a reference voltage, wherein the at least one comparator is configured to control the current flowing in the plurality of LEDs by controlling an operation of the switching element based on a comparison between the voltage output from the integrating circuit and the reference voltage.

According to an aspect of still another exemplary embodiment, there is provided an apparatus for driving a light emitting diode (LED), the apparatus including: a current control circuit connected to an output terminal of a plurality of LEDs and configured to control a current flowing in the plurality of LEDs based on a sensing voltage detected from the output terminal of the plurality of LEDs; and a protective circuit configured to block the current flowing in the plurality of LEDs by controlling an operating voltage of the current control circuit based on the sensing voltage.

BRIEF DESCRIPTION OF DRAWINGS

The above and/or other aspects will be more apparent by describing certain example embodiments with reference to the accompanying drawings, in which.

DETAILED DESCRIPTION

Figure 1:
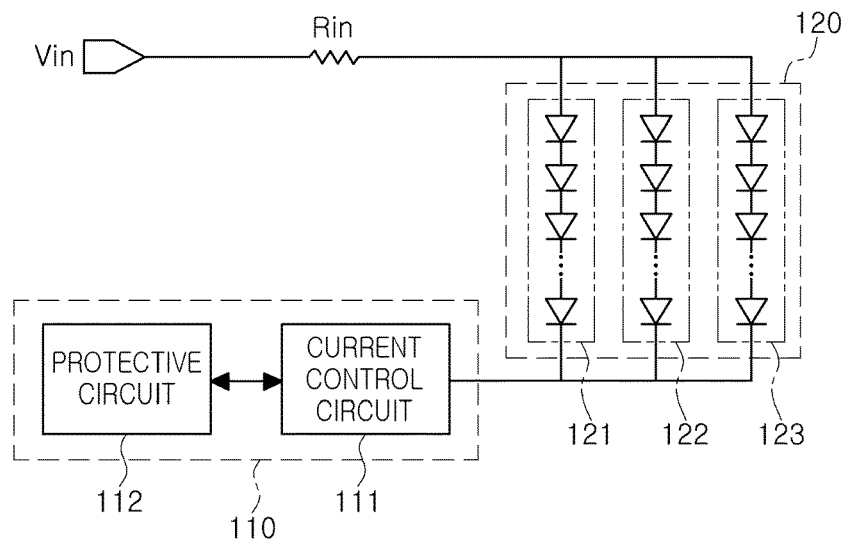
FIG. 1 is a schematic block diagram of a lighting apparatus including a light emitting diode (LED) driving apparatus according to an example embodiment.

Hereinafter, certain exemplary embodiments will be described as follows with reference to the attached drawings.

The present inventive concept may, however, be exemplified in many different forms and should not be construed as being limited to the specific embodiments set forth herein. Rather, these embodiments are provided so that this disclosure will be thorough and complete, and will fully convey the scope of the disclosure to those skilled in the art.

Throughout the specification, it will be understood that when an element, such as a layer, region or wafer (substrate), is referred to as being "on," "connected to," or "coupled to" another element, it can be directly "on," "connected to," or "coupled to" the other element or other elements intervening therebetween may be present. In contrast, when an element is referred to as being "directly on," "directly connected to," or "directly coupled to" another element, there may be no elements or layers intervening therebetween. Like numerals refer to like elements throughout. As used herein, the term "and/or" includes any and all combinations of one or more of the associated listed items.

It will be apparent that though the terms first, second, third, etc. may be used herein to describe various members, components, regions, layers and/or sections, these members, components, regions, layers and/or sections should not be limited by these terms. These terms are only used to distinguish one member, component, region, layer or section from another region, layer or section. Thus, a first member, component, region, layer or section discussed below could be termed a second member, component, region, layer or section without departing from the teachings of the example embodiments.

Spatially relative terms, such as "above," "upper," "below," and "lower" and the like, may be used herein for ease of description to describe one element's relationship to another element(s) as shown in the figures. It will be understood that the spatially relative terms are intended to encompass different orientations of the device in use or operation in addition to the orientation depicted in the figures. For example, if the device in the figures is turned over, elements described as "above," or "upper" other elements would then be oriented "below," or "lower" the other elements or features. Thus, the term "above" can encompass both the above and below orientations depending on a particular direction of the figures. The device may be otherwise oriented (rotated 90 degrees or at other orientations) and the spatially relative descriptors used herein may be interpreted accordingly.

The terminology used herein is for describing particular embodiments only and is not intended to be limiting. As used herein, the singular forms "a," "an," and "the" are intended to include the plural forms as well, unless the context clearly indicates otherwise. It will be further understood that the terms "comprises," and/or "comprising" when used in this specification, specify the presence of stated features, integers, steps, operations, members, elements, and/or groups thereof, but do not preclude the presence or addition of one or more other features, integers, steps, operations, members, elements, and/or groups thereof.

Hereinafter, embodiments will be described with reference to schematic views illustrating embodiments. In the drawings, for example, due to manufacturing techniques and/or tolerances, modifications of the shape shown may be estimated. Thus, embodiments should not be construed as being limited to the particular shapes of regions shown herein, for example, to include a change in shape results in manufacturing. The following embodiments may also be constituted by one or a combination thereof.

FIG. 1 is a schematic block diagram of a lighting apparatus including a light emitting diode (LED) driving apparatus according to an example embodiment.

With reference to FIG. 1, a lighting apparatus 100 according to an example embodiment may include a light source 120 including a plurality of LEDs, and an LED driving apparatus 110 controlling an operation of the light source 120. The light source 120 may include a plurality of LED strings 121, 122, and 123 connected to one another in parallel. In each of the LED strings 121, 122, and 123, LEDs are connected to each other in series. A connection structure of the plurality of LEDs included in the light source 120 may also be variously formed in manners different from the illustration depicted in FIG. 1.

The LED driving apparatus 110 may include a current control circuit 111 and a protective circuit 112. The current control circuit 111 may include a circuit connected to an output terminal of the plurality of LEDs included in the light source 120 to linearly control a current flowing in the plurality of LEDs. To linearly control a current flowing in the plurality of LEDs, the current control circuit 111 may include a switching element (or switch) connected to the output terminal of the plurality of LEDs, and an operation of the switching element may be controlled by at least one comparator. Although the example embodiment of FIG. 1 illustrates that the output terminal of the plurality of LED strings 121, 122, and 123 are connected to a single current control circuit 111, example embodiments are not limited thereto. For example, the LED strings 121, 122, and 123 may be connected to different current control circuits, respectively.

The protective circuit 112 may be a circuit that protects the LED driving apparatus 110 and the plurality of LEDs from overvoltage, overcurrent generated due to short circuits, or the like. In an example embodiment, a single protective circuit 112 may provide over voltage protection (OVP) and/or short current protection (SCP). To implement the over voltage protection and/or short current protection by a single circuit, the protective circuit 112 may detect a current flowing in the output terminal of the plurality of LEDs to generate a sensing voltage.

The protective circuit 112 may detect a current flowing in the output terminal of the plurality of LEDs to generate the sensing voltage, and may control operations of the current control circuit 111 using the sensing voltage. According to an example embodiment, when an input voltage Vin is increased to exceed a normal range, or a failure such as a short circuit occurring in at least one of the plurality of LEDs to cause the increase in the sensing voltage, the protective circuit 112 may stop an operation of the current control circuit 111 to provide the over voltage protection and/or short current protection.

In an example embodiment, the input voltage Vin may be a direct current voltage having a value within a predetermined range. For example, when the lighting apparatus 100 according to an example embodiment is used as lighting apparatuses such as an interior light, a headlamp, and a taillight for vehicles, and the like, the input voltage Vin may be a direct current voltage output from a battery or a generator installed in a vehicle, and may have a value of about 15 V. For example, when the lighting apparatus 100 according to an example embodiment is applied to lighting fixtures installed indoors or outdoors, the input voltage Vin may be a direct current voltage generated by rectifying commercial alternating current power.

Figure 2:
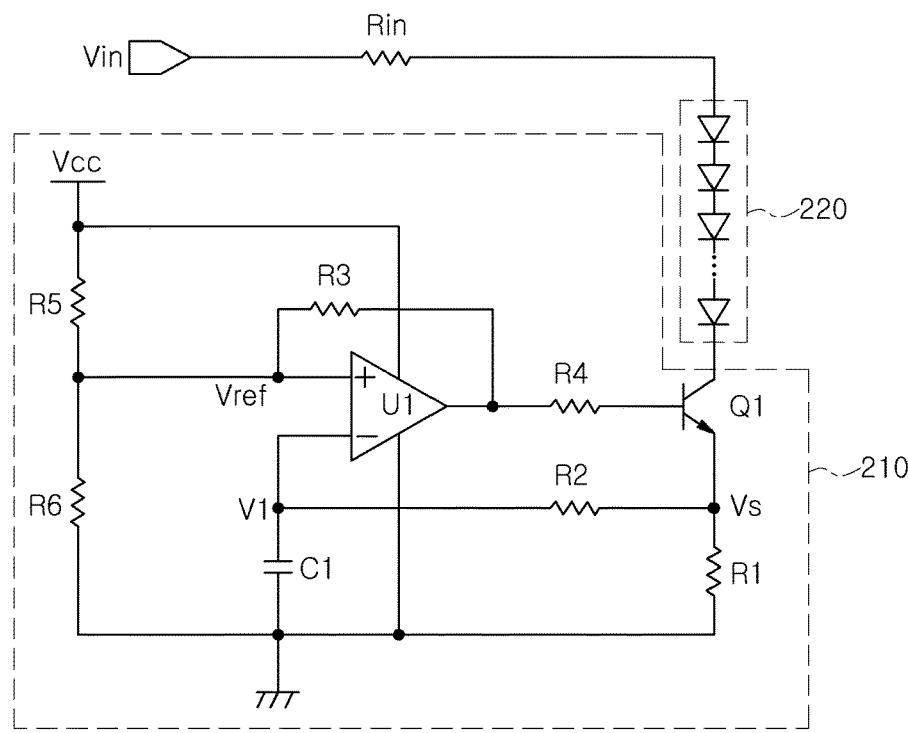
FIG. 2 is a schematic circuit diagram of an LED driving apparatus according to an example embodiment.

FIG. 2 is a schematic circuit diagram of an LED driving apparatus according to an example embodiment.

With reference to FIG. 2, a lighting apparatus 200 according to an example embodiment may include an LED driving apparatus 210 and a light source 220 including a plurality of LEDs. The LED driving apparatus 210 may include a current control circuit. The current control circuit may include a switching element Q1 connected to the output terminal of the plurality of LEDs included in the light source 220, at least one comparator U1 controlling an operation of the switching element Q1, and the like. Here, the connection of the switching element Q1 to the output terminal of the plurality of LEDs may be understood as the switching element Q1 being connected to an LED of which a cathode is not connected to any one of other LEDs, among the plurality of LEDs connected to each other in series or in parallel.

The switching element Q1 is illustrated as a bipolar junction transistor but may also include an electrical field effect transistor or the like. An output from the comparator U1 may be input to a control terminal (or a base terminal) of the switching element Q1, and the switching element Q1 may be turned on when a voltage of a non-inverted input terminal of the comparator U1 is higher than a voltage of an inverted input terminal thereof. When the switching element Q1 is turned on, a current may flow in the plurality of LEDs, and when the switching element Q1 is turned off, a current may not flow in the plurality of LEDs. The current control circuit may control a duty ratio of a current flowing in the plurality of LEDs by adjusting a ratio of a turn-on time of the switching element Q1 while the switching element Q1 is turned on to a turn-off time of the switching element Q1 while the switching element Q1 is turned off, thereby controlling an average value of a current flowing in the plurality of LEDs.

In the example embodiment of FIG. 2, a predetermined reference voltage Vref may be input to the non-inverted input terminal of the comparator U1. The reference voltage Vref may be generated by a constant voltage Vcc and a voltage distribution circuit including resistors R5 and R6, and may be a square wave voltage having a predetermined cycle. A first voltage V1 generated by an emitter voltage Vs of the switching element Q1 may be input to the inverted input terminal of the comparator U1.

Figure 3:
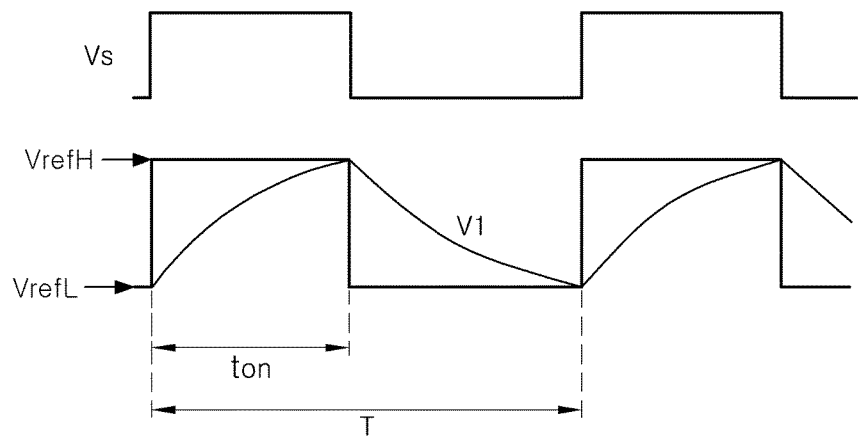
FIG. 3 is a waveform diagram illustrating operations of the LED driving apparatus illustrated in FIG. 2.

Resistors R1 and R2, and a capacitor C1 that configure an integrating circuit to generate the first voltage V1 based on the emitter voltage Vs may be connected to the emitter terminal of the switching element Q1. The capacitor C1 may be charged or discharged by the emitter voltage Vs of the switching element Q1. The first voltage V1 determined by a charging or discharging state of the capacitor C1 may be supplied to the inverted input terminal of the comparator U1. The emitter voltage Vs of the switching element Q1 may have a square wave waveform as in the current flowing in the plurality of LEDs, and since the capacitor C1 is charged or discharged by the emitter voltage Vs, the first voltage V1 may have a waveform that gradually increases and decreases over time, as illustrated in FIG. 3. Hereinafter, operations of the LED driving apparatus 210 according to the example embodiment of FIG. 2 will be described referring to FIG. 2 and FIG. 3.

FIG. 3 is a waveform diagram illustrating operations of the LED driving apparatus illustrated in FIG. 2. With reference to FIG. 3, the emitter voltage Vs, the reference voltage Vref, and the first voltage V1 are illustrated. As described above, the output from the comparator U1 may turn on or turn off the switching element Q1 based on levels of the reference voltage Vref and the first voltage V1 that are supplied to the non-inverted input terminal and the inverted input terminal of the comparator U1, respectively. The emitter voltage Vs may have a waveform such as a square wave, and the reference voltage Vref may be generated as a square wave having the same period as that of the emitter voltage Vs. The first voltage V1 may have a waveform as illustrated in FIG. 3 according to a time constant to charge or discharge the capacitor C1.

The reference voltage Vref may have a high level of VrefH while the switching element Q1 is turned on to allow a current to flow in the plurality of LEDs. Simultaneously, the capacitor C1 may be charged by a current flowing through the plurality of LEDs and the switching element Q1 to increase the first voltage V1. When the first voltage V1 is increased to VrefH having the same level as the reference voltage Vref, an output from the comparator U1 may be changed to have a low level, and the switching element Q1 may be turned off to stop light emission operations of the plurality of LEDs.

For example, when the capacitor C1 is discharged, and thus the first voltage V1 is lowered to a low level VrefL of the reference voltage Vref, the level of the first voltage V1 may be again increased, and thus an output from the comparator U1 may be changed to have a high level, and the plurality of LEDs may operate.

An average value of current flowing in the plurality of LEDs may be determined by a ratio of time T during one cycle to a time ton while the switching element Q1 is turned on, a value of a constant current flowing while the plurality of LEDs operate, and the like. For example, as the time ton while the switching element Q1 is turned on is increased, an average value of a current flowing in the plurality of LEDs may be increased. For example, in the example embodiment, operations of the plurality of LEDs may be controlled by adjusting a ratio of the time ton while the switching element Q1 is turned on to a time T during one cycle.

When the switching element Q1 is turned on, since the switching element Q1 has a relatively low ON-resistance value, stress applied to the switching element Q1 for the time ton while the switching element Q1 is turned on may be substantially reduced. In addition, when the switching element Q1 is turned off by the comparator U1, since the current does not flow in the switching element Q1 at all, stress may not be applied thereto. Thus, according to an example embodiment, stress applied to the switching element Q1 may be reduced regardless of whether the switching element Q1 is turned on or off. Since a problem such as generation of heat and the like may occur while the switching element Q1 is turned on, the resistor R1 connected to a collector terminal of the switching element Q1 may be implemented by a plurality of resistance elements connected to each other in parallel.

In detail, in the example embodiment, stress applied to the switching element Q1 may be reduced regardless of whether the switching element Q1 is turned on or off. Thus, the switching element Q1 may be implemented without using a device having a relatively great capacity or without connecting a plurality of elements in parallel. Thus, an increase in costs may be prevented.

Figure 4:
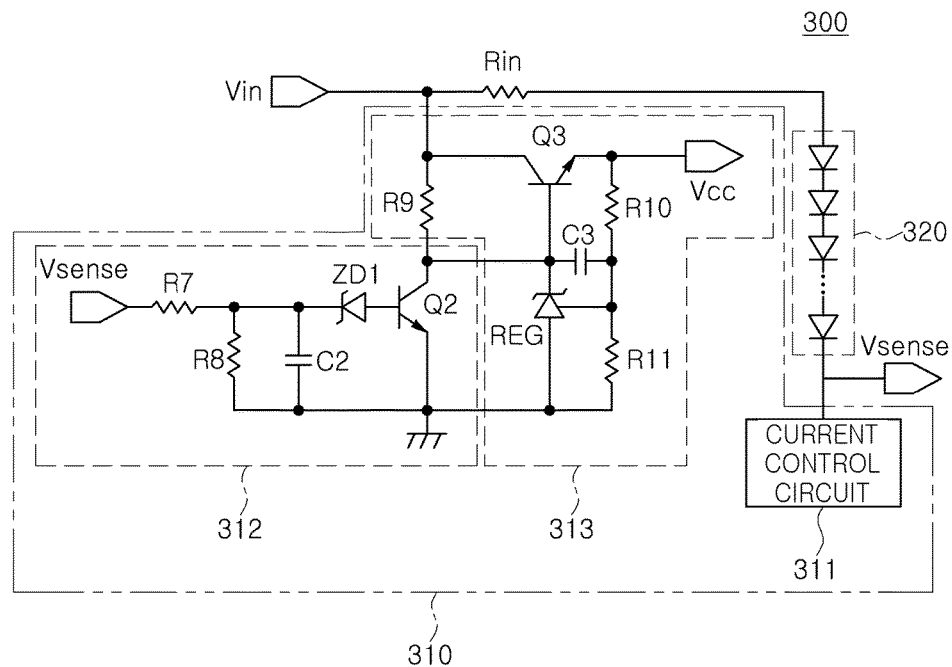
FIG. 4 is a schematic circuit diagram of an LED driving apparatus according to an example embodiment.

FIG. 4 is a schematic circuit diagram of an LED driving apparatus according to an example embodiment.

With reference to FIG. 4, an LED driving apparatus 300 according to an example embodiment may include a current control circuit 311 controlling operations of a light source 320 including a plurality of LEDs, a protective circuit 312 controlling operations of the current control circuit 311, a regulator circuit 313 supplying an output voltage Vcc to the current control circuit 311, and the like. The current control circuit 311 may have the same configuration as that of the example embodiment of FIG. 2 or other various circuit configurations.

The protective circuit 312 may be a circuit that provide overvoltage protection and/or short current protection, and may be implemented by a zener diode ZD1, a switching element Q2, and the like. The regulator circuit 313 may provide the output voltage Vcc to the current control circuit 311 and the like using an input voltage Vin, and may be implemented by a shunt regulator REG, a switching element Q3, and the like. In this case, the shunt regulator REG may be connected to the switching element Q2 included in the protective circuit 312 in parallel. The output voltage Vcc generated by the shunt regulator REG may be supplied to an active device included in the current control circuit 311 as an operating voltage.

The protective circuit 312 may provide the over voltage protection and/or short current protection using a sensing voltage Vsense. The sensing voltage Vsense may be a voltage generated by detecting a current flowing in the plurality of LEDs, and may also be a voltage detected from the output terminal of the plurality of LEDs.

The sensing voltage Vsense may pass through resistors R7 and R8 to charge a capacitor C2. For example, when a voltage of the capacitor C2 is increased to be higher than a zener voltage of the zener diode ZD1 as the sensing voltage Vsense is increased, the switching element Q2 may be turned on. When the switching element Q2 is turned on, at least a portion of a current flowing in the shunt regulator REG may flow to the switching element Q2. Thus, the output voltage Vcc from the regulator circuit 313 may be reduced. As described above, the output voltage Vcc from the regulator circuit 313 may be supplied as an operating voltage to an active device included in the current control circuit 311. As a result, when the sensing voltage Vsense is increased, the output voltage Vcc of the regulator circuit 313 may be reduced to stop an operation of the current control circuit 311, and the plurality of LEDs may be turned off.

The sensing voltage Vsense may be increased when the input voltage Vin is increased or a forward voltage of the plurality of LEDs is reduced. When the input voltage Vin is excessively increased to exceed a normal range, a portion of the plurality of LEDs may be damaged, or stress may be applied to the current control circuit 311, or the like, thereby causing breakage of a circuit. In an example embodiment, when the input voltage Vin is increased and thus the sensing voltage Vsense is increased, the regulator circuit 313 may reduce the output voltage Vcc that is supplied to an active device of the current control circuit 311 to stop the operation of the current control circuit 311. Accordingly, the plurality of LEDs are turned off, thereby providing an over voltage protection of the protective circuit 312.

For example, in a case in which a short circuit occurs in at least a portion of the plurality of LEDs, a forward voltage of the plurality of LEDs may be reduced. Even when the input voltage Vin has a value within a normal range, in a case in which the forward voltage of the plurality of LEDs is reduced, the sensing voltage Vsense detected from the output terminal of the plurality of LEDs may be increased. Thus, in a manner similar to the case in which the input voltage Vin is increased, when a short circuit occurs in at least a portion of the plurality of LEDs, the protective circuit 312 may reduce the output voltage Vcc that is supplied to an active device of the current control circuit 311. Accordingly, an operation of the current control circuit 311 may be stopped to turn off the plurality of LEDs and provide a short current protection.

As a result, in the cases in which the input voltage Vin is increased in an abnormal manner and a short circuit occurs in at least a portion of the plurality of LEDs, the sensing voltage Vsense detected by the output terminal of the plurality of LEDs is increased. In an example embodiment, since the protective circuit 312 may reduce the output voltage Vcc of the regulator circuit 313 when the sensing voltage Vsense is increased to stop an operation of the current control circuit 311, the over voltage protection and short current protection may be implemented by a single protective circuit 312.

Figure 5:
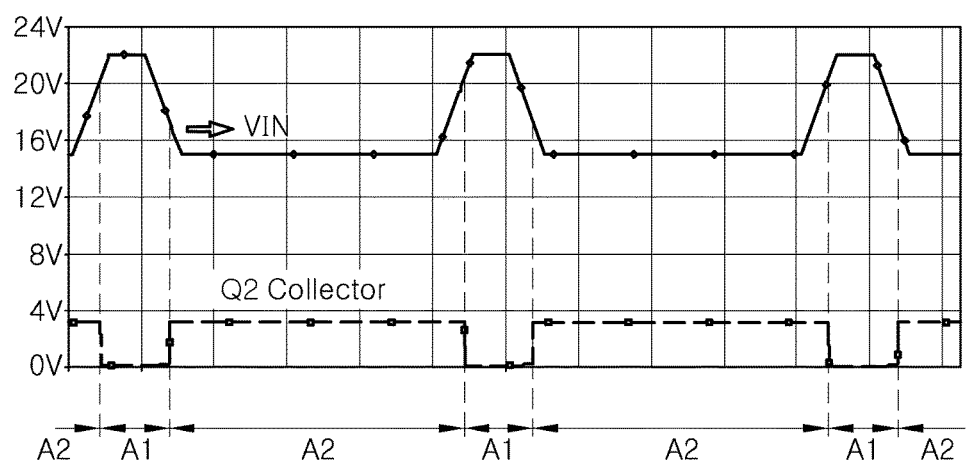
FIG. 5 is a waveform diagram illustrating operations of an LED driving apparatus illustrated in FIG. 4.

FIG. 5 is a waveform diagram illustrating operations of an LED driving apparatus illustrated in FIG. 4.

With reference to FIG. 5, a waveform of the input voltage Vin and a waveform of a collector terminal voltage of the switching element Q2 are illustrated by way of example. The switching element Q2 may be included in the protective circuit 312 as illustrated in FIG. 4, and may be turned on or off according to a magnitude of the sensing voltage Vsense.

The input voltage Vin may have a voltage within a range of about 15 V in a normal operating range, but may also be increased to a value greater than 15 V due to a specific factor. As illustrated in the waveform diagram of FIG. 5, a protective section A1, in which the protective circuit 312 operates, and a non-protective section A2 may be defined based on a change in the input voltage Vin. Relationships between the input voltage Vin and the sensing voltage Vsense in the respective protective section A1 and non-protective section A2 may be represented by Equation 1 below.

$$V\text{sense} = V\text{in} \quad \text{(During protective section A1)}$$

$$V\text{sense} = V\text{in} - I_{LED} \times R\text{in} - Vf \quad \text{(During non-protective section A2)} \quad \text{[Equation 1]}$$

In Equation 1, $I_{LED}$ may refer to a current flowing in the plurality of LEDs and an input resistor Rin, and Vf may refer to a forward voltage in the entirety of the plurality of LEDs. For instance, Vsense in the non-protective section A2 may have a level lower than that in the protective section A1.

For example, when the input voltage Vin is increased to be higher than a predetermined threshold value, for example, about 20 V in the example embodiment of FIG. 5, the sensing voltage Vsense may be increased to have a level higher than a zener voltage of the zener diode ZD1. Thus, the switching element Q2 may be turned on, and a voltage of the collector terminal thereof may be reduced to a ground voltage and may lower the output voltage Vcc of the regulator circuit 313 by drawing a current flowing in the shunt regulator REG to the switching element Q2.

When the output voltage Vcc of the regulator circuit 313 is reduced, the active device included in the current control circuit 311 may not be operated and thus the plurality of LEDs are turned off. When the plurality of LEDs are turned off, a current may not flow in the input resistor Rin and the plurality of LEDs, and thus, a voltage drop does not occur and the sensing voltage Vsense may be increased to have a level equal to a value of the input voltage Vin. As illustrated in Equation 1, the sensed voltage Vsense and the input voltage Vin may have the same value in the protective section A in which the protective circuit 312 is operated.

When the input voltage Vin is reduced in the protective section A1 and enters the non-protective section A2, the sensing voltage Vsense may be reduced, and thus, an operation of the protective circuit 312 may be stopped. Here, since the switching element Q2 is again turned off to increase the output voltage Vcc of the regulator circuit 313, the current control circuit 313 may be again operated. In this case, since the input voltage Vin and the sensing voltage Vsense have the same value in the protective section A1, in order for the sensing voltage Vsense to be lower than the zener voltage of the zener diode ZD1 in the non-protective section A2, the input voltage Vin needs to have a level, for example, about 17 V, which is equal to or lower than a voltage value, for example, about 20 V, at which the protective section A1 starts.

In an example embodiment, a value of the input voltage Vin at which the protective circuit 312 starts to operate may be different from a value of the input voltage Vin at which the protective circuit 312 stops the operation thereof. Thus, the protective circuit 312 may be prevented from being operated due to a noise component contained in the input voltage Vin. As a result, the protective circuit 312 may be implemented without causing the problem such as chattering occurring due to a continuously repetitive operation of the protective circuit 312.

Figure 6:
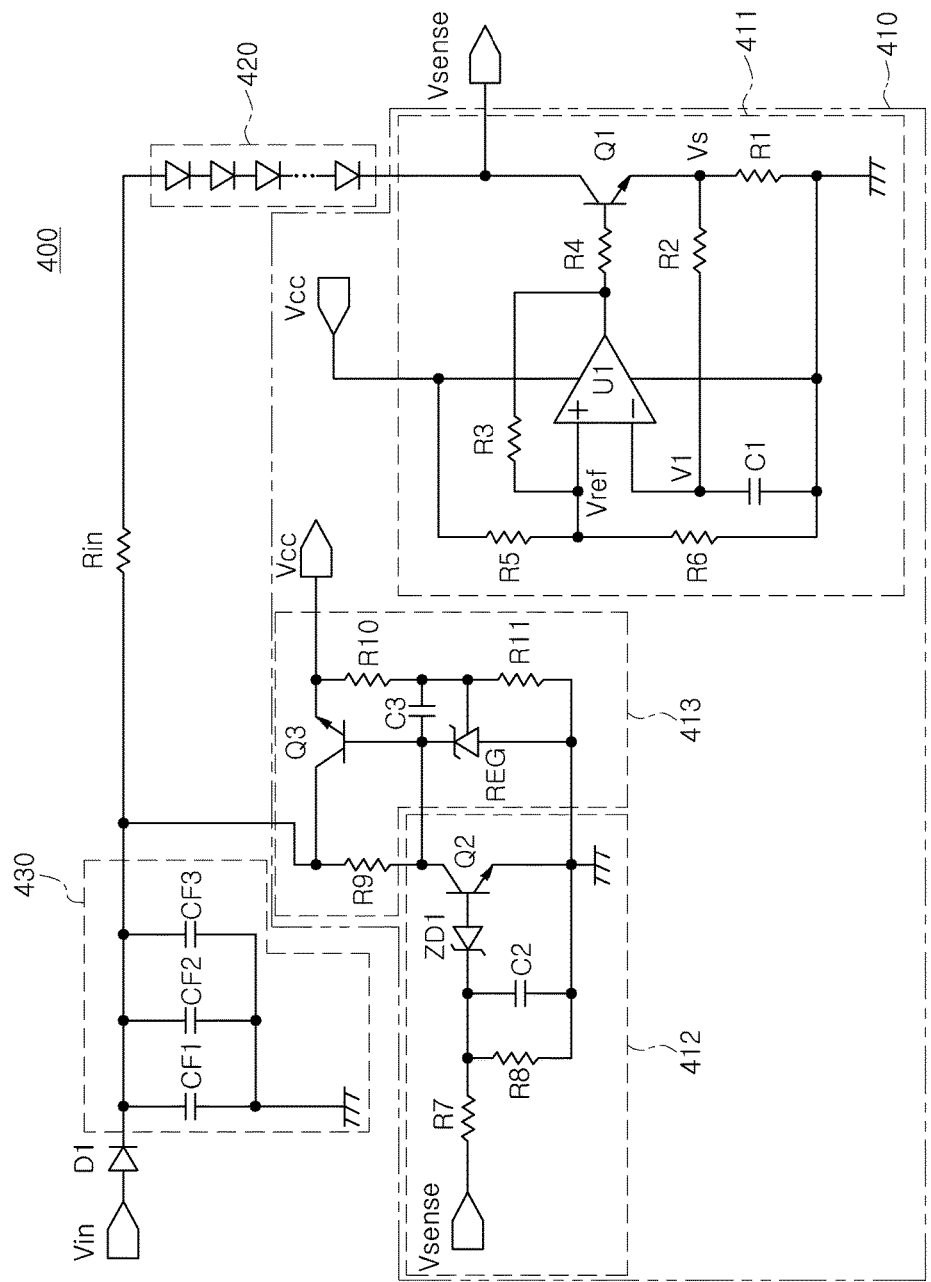
FIG. 6 is a circuit diagram of an LED driving apparatus according to an example embodiment.

FIG. 6 is a circuit diagram of an LED driving apparatus according to an example embodiment.

An LED driving apparatus 400 according to an example embodiment may include a current control circuit 411, a protective circuit 412, a regulator circuit 413, and the like. The current control circuit 411 may control a current flowing in a plurality of LEDs included in a light source 420. The protective circuit 412 may provide an over voltage protection and/or short current protection using a sensing voltage Vsense detected by an output terminal of the plurality of LEDs. The regulator circuit 413 may supply an operating voltage Vcc to the current control circuit 411 by using an input voltage Vin.

Hereinafter, operations of the LED driving apparatus 400 according to the example embodiment of FIG. 6 will be described. The input voltage Vin may be a direct current voltage, and may be supplied to the plurality of LEDs through a diode D1, a filter unit 430 including capacitors CF1 to CF3, and an input resistor Rin. For example, when the input voltage Vin is higher than a forward voltage of the plurality of LEDs, the plurality of LEDs may be operated.

The current control circuit 411 may include at least one comparator U1, and a switching element Q1 connected to the output terminal of the plurality of LEDs. The comparator U1 may compare a reference voltage Vref generated by a voltage distribution circuit connected to a non-inverted terminal of the comparator U1 with a first voltage V1 corresponding to a voltage of a capacitor C1 and control operations of the switching element Q1 based on a result of the comparison. The first voltage V1 may be a voltage having a level determined by charging or discharging of the capacitor C1 by an emitter voltage Vs of the switching element Q1, and may have a level corresponding to the sensing voltage Vsense.

For example, when the reference voltage Vref is higher than the first voltage V1, the switching element Q1 may be turned on to operate the plurality of LEDs. The current control circuit 411 may adjust a degree of brightness of the plurality of LEDs by adjusting a ratio of a turn-on time of the switching element Q1 while the switching element Q1 is turned on to a turn-off time of the switching element Q1 while the switching element Q1 is turned off to control an average value of current flowing in the plurality of LEDs. Thus, since a majority of stress and heat are generated in a resistive element R1 regardless of whether the switching element Q1 is turned on or off, the configuration of a circuit may be simplified without an increase in cost.

For example, when a level of the input voltage Vin is excessively increased, the level of the sensing voltage Vsense may also be increased. When the sensing voltage Vsense is increased to have a level higher than that of a zener voltage of a zener diode ZD1 included in the protective circuit 412, the switching element Q2 may be turned on to allow at least a portion of a current flowing in the shunt regulator REG to be drawn to the switching element. Thus, an operating voltage Vcc supplied to the comparator U1 of the current control circuit 411 by the regulator circuit 413 may be reduced, and an operation of the comparator U1 may be stopped to stop operations of the plurality of LEDs.

In a case in which the input voltage Vin is maintained within a normal value range, while a portion of the plurality of LEDs is short circuited, a forward voltage of the light source 420 may be reduced to increase the sensed voltage Vsense. Thus, in a manner similar to the case in which the input voltage Vin is increased, the operating voltage Vcc supplied to the comparator U1 by the regulator circuit 413 may be reduced, and an operation of the comparator U1 may be stopped to protect the plurality of LEDs and circuits of the LED driving apparatus 400. Thus, according to an example embodiment, the single protective circuit 412 may provide over voltage protection in the case in which the input voltage Vin is increased and short current protection in the case in which at least a portion of the plurality of LEDs is short circuited.

Figure 7:
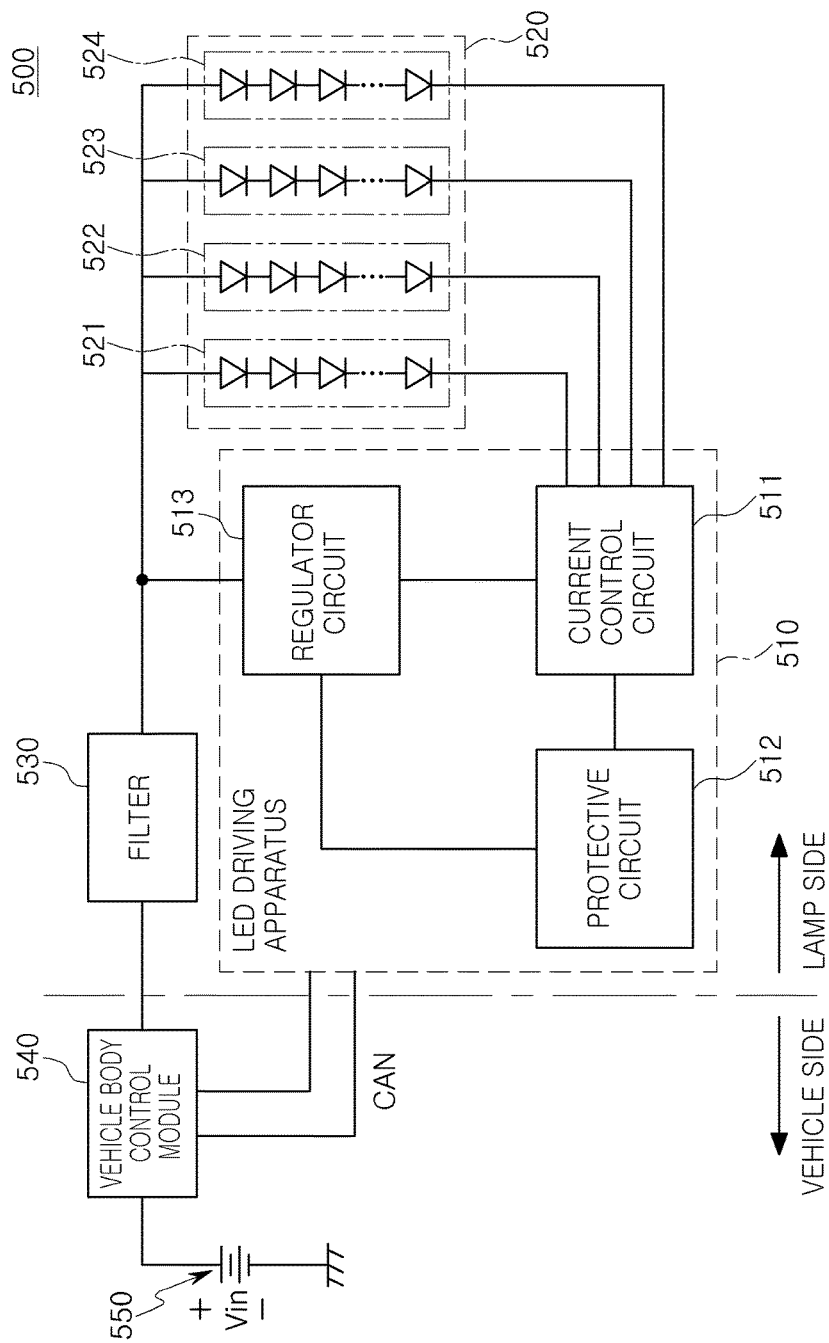
FIG. 7 is a schematic block diagram of a lighting apparatus according to an example embodiment.

FIG. 7 is a schematic block diagram of a lighting apparatus according to an example embodiment.

With reference to FIG. 7, a lighting apparatus 500 according to an example embodiment may be used as a lighting apparatus for a vehicle, for example, a lighting apparatus applied to interior lights, headlamps, taillights, and the like. A power source 550 may be a battery, a generator, or the like for a vehicle, and may supply an input voltage Vin in a direct current form. The input voltage Vin may be converted into a voltage having a desirable level by a vehicle body control module 540, and may then be transferred to an LED driving apparatus 510, a light source 520, and the like, through a filter 530.

The light source 520 may include a plurality of LED strings 521 to 524. The example embodiment of FIG. 7 illustrates the case in which the light source 520 includes a first to a fourth LED strings 521 to 524 by way of an example, but is not limited thereto. The first to fourth LED strings 521 to 524 may be provided as light sources for different purposes, and may emit light having different colors, degrees of brightness, and the like. For example, when the light source 520 is applied to a headlamp of a vehicle, the first to fourth LED strings 521 to 524 may correspond to respective light sources for low beams, high beams, daytime running lights, a turn signal, and the like, respectively.

The LED driving apparatus 510 may include a current control circuit 511, a protective circuit 512, a regulator circuit 513, and the like. The current control circuit 511 may be connected to respective output terminals of the LED strings 521 to 524 to independently control an average value of current flowing in the LED strings 521 to 524. Although the current control circuit 511 is illustrated as a single block in FIG. 7, separate current control circuits 511 may be connected to the LED strings 521 to 524, respectively.

For example, the protective circuit 512 may be provided such that when the input voltage Vin is increased to exceed a normal range and/or at least a portion of LEDs included in the LED strings 521 to 524 are short circuited, the regulator circuit 513 may block an operating voltage from being supplied to the current control circuit 511, thereby protecting the LED strings 521 to 524 and the LED driving apparatus 510. The protective circuit 512 may include a switching element capable of blocking an output from the regulator circuit 513, and in detail, may determine whether the input voltage Vin is increased and/or at least a portion of LEDs included in the LED strings 521 to 524 are short circuited, based on a sensed voltage detected by respective output terminals of the LED strings 521 to 524.

The regulator circuit 513 may supply an operating voltage to the current control circuit 511 by using the input voltage Vin. An active device included in the current control circuit 511 may be operated by an operating voltage supplied by the regulator circuit 513. For example, when the input voltage Vin is increased and/or at least a portion of LEDs is short circuited, the protective circuit 512 may block the supply of an operating voltage to stop an operation of the current control circuit 511 and thus protect the LED strings 521 to 524 and the LED driving apparatus 510.

Figure 8:
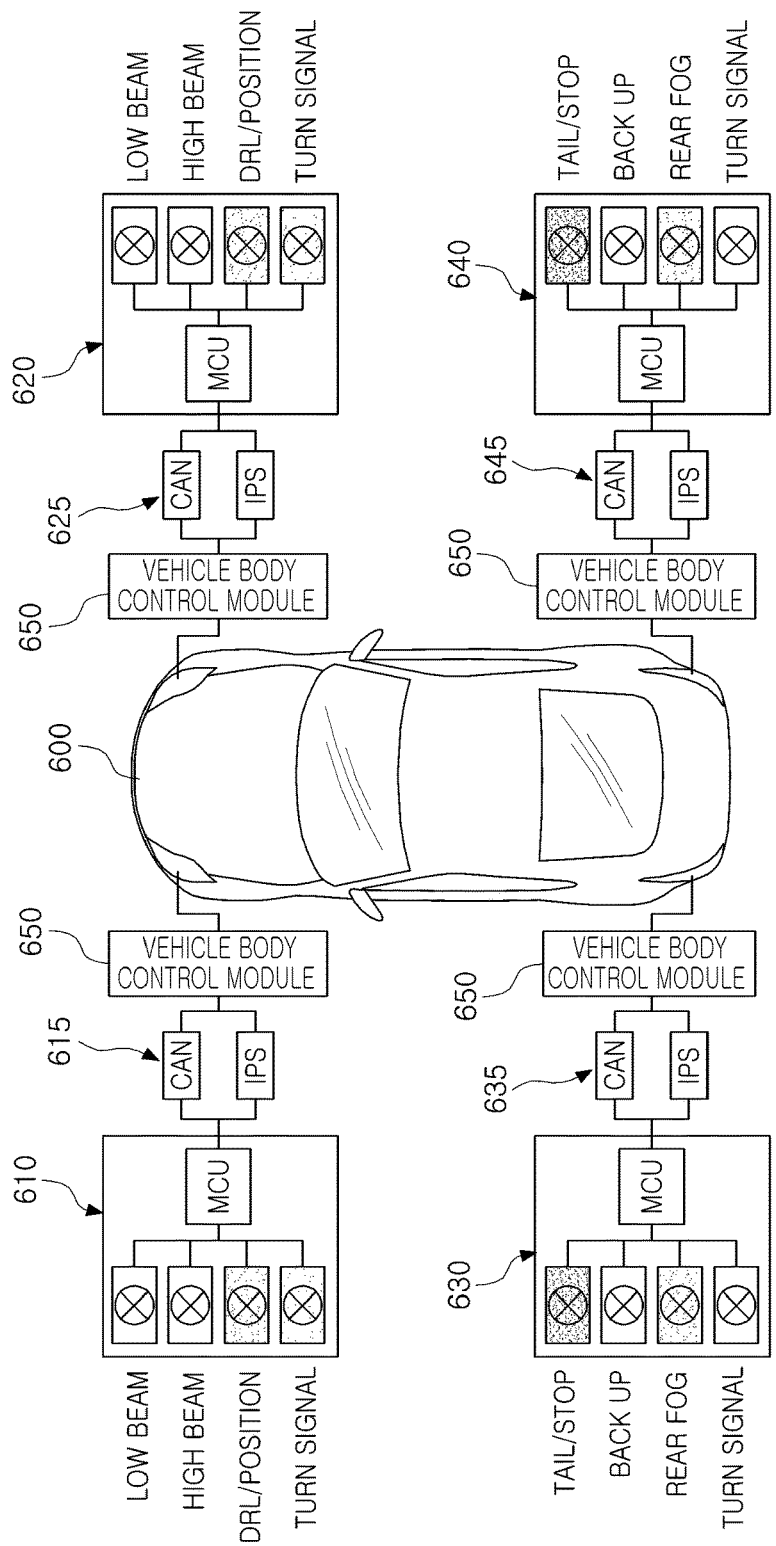
FIG. 8 is a drawing illustrating a configuration of a vehicle to which an LED driving apparatus according to example embodiments is applied.

FIG. 8 is a drawing illustrating the configuration of a vehicle to which an LED driving apparatus according to example embodiments is applied.

With reference to FIG. 8, the LED driving apparatuses 610 to 640 according to example embodiments may be applied to headlamps and taillights of a vehicle 600, respectively. The LED driving apparatuses 610 to 640 may be communicatively connected to vehicle body control modules 650 respectively, via a communications protocol such as a controller area network (CAN) or the like. An intelligent power switch (IPS) may be respectively provided between the LED driving apparatuses 610 to 640 and the vehicle body control modules 650. The IPS may be used in detecting short wires, short circuits, overcurrent, and the like, occurring in the LED driving apparatuses 610 to 640.

Although FIG. 8 illustrates the case in which the LED driving apparatuses 610 to 640 are arranged on left and right headlamps and left and right taillights of the vehicle 600, respectively, various different configurations of the LED driving apparatus 610 to 640 may be implemented according to exemplary embodiments. For example, operations of the left and right headlamps of the vehicle 600 may be controlled by one LED driving apparatus, and operations of the left and right taillights of the vehicle 600 may be controlled by another LED driving apparatus. In addition, the left and right headlamps and the left and right taillights of the vehicle 600 may both be controlled by a single LED driving apparatus.

An LED driving apparatus and an LED lighting apparatus according to various example embodiments may be applied to various applications including vehicles. Hereinafter, various applications to which an LED driving apparatus and an LED lighting apparatus according to various example embodiments may be applied will be described.

Figure 9:
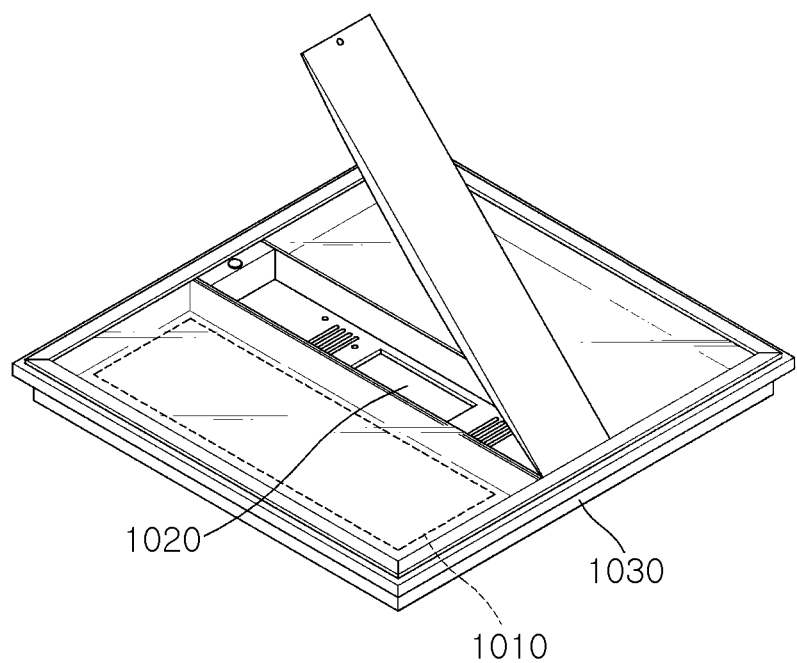
FIG. 9 is a schematic perspective view of a planar lighting apparatus to which an LED driving apparatus according to example embodiments may be applied.

FIG. 9 is a schematic perspective view of a planar lighting apparatus to which an LED driving apparatus according to example embodiments may be applied.

With reference to FIG. 9, a planar lighting apparatus 1000 may include a light source module 1010, a power supply device 1020, and a housing 1030. According to an example embodiment, the light source module 1010 may include a light emitting device array as a light source, and the power supply device 1020 may include a light emitting device driver.

The light source module 1010 may include a light emitting device array, and may have an overall planar shape. According to an example embodiment, the light emitting device array may include a light emitting device and a controller in which driving information of the light emitting device is stored.

The power supply device 1020 may be configured to supply power to the light source module 1010. The housing 1030 may have an accommodation space in which the light source module 1010 and the power supply device 1020 are accommodated, and may have a parallelepiped shape of which one side is open, but is not limited thereto. The light source module 1010 may be disposed to emit light to an open side of the housing 1030.

Any one of the LED driving apparatuses according to example embodiments may be applied to the power supply device 1020. In detail, by applying a protective circuit together with a current control circuit according to an example embodiment to the power supply device 1020, the light source module 1010 may be stably operated even in a case in which input power has an unstable level, and the light source module 1010 may be protected from overvoltage and/or a short circuit. In addition, a substantially lower number of switching elements may be included in the current control circuit to lower a cost of a circuit.

Figure 10:
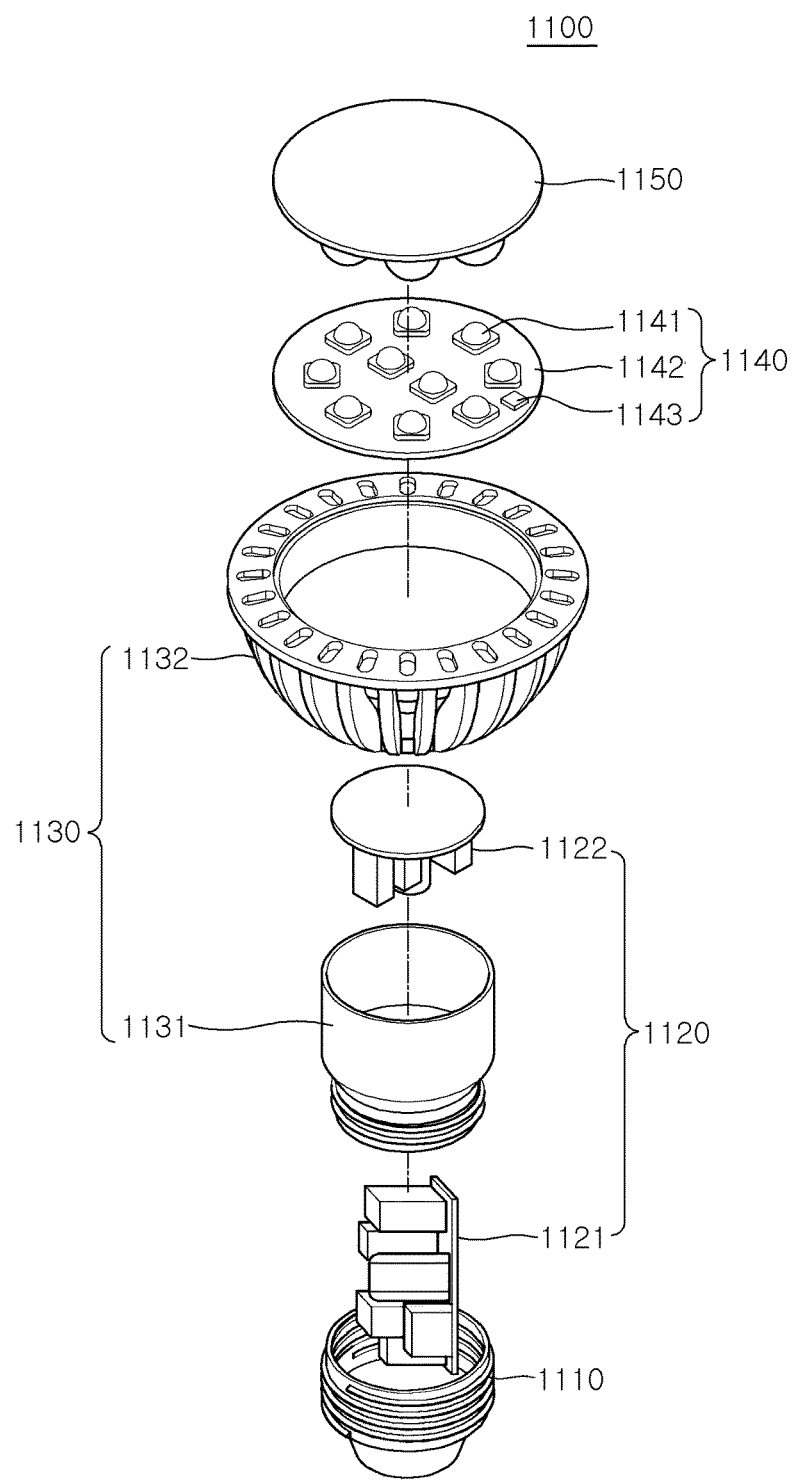
FIG. 10 is a schematic exploded perspective view of a bulb-type lamp as a lighting apparatus to which an LED driving apparatus according to example embodiments may be applied.

FIG. 10 is a schematic exploded perspective view of a bulb-type lamp, as a lighting apparatus to which an LED driving apparatus according to example embodiments may be applied.

In detail, a lighting apparatus 1100 may include a socket 1110, a power supply unit 1120, a heat sink 1130, a light source module 1140, and an optical unit 1150. According to an example embodiment, the light source module 1140 may include a light emitting device array, and the power supply unit 1120 may include a light emitting device driver.

The socket 1110 may be replaceable with that of an existing lighting apparatus. Power supplied to the lighting apparatus 1100 may be applied through the socket 1110. As illustrated in FIG. 10, the power supply unit 1120 may include a first power supply portion 1121 and a second power supply portion 1122 that are separated from or coupled to each other. The heat sink 1130 may include an internal radiation portion 1131 and an external radiation portion 1132. The internal radiation portion 1131 may be directly connected to the light source module 1140 and/or the power supply unit 1120, by which heat may be transferred to the external radiation portion 1132. The optical unit 1150 may include an internal optical portion (not shown) and an external optical portion (not shown), and may be configured to evenly distribute light emitted by the light source module 1140.

The light source module 1140 may receive power from the power supply unit 1120 to emit light to the optical unit 1150. The light source module 1140 may include one or more light emitting devices 1141, a circuit board 1142, and a controller 1143, and the controller 1143 may store driving information of the light emitting devices 1141.

Any one of the LED driving apparatuses according to example embodiments may be provided as the controller 1143 and the power supply unit 1120. For example, a current control circuit, a protective circuit, and the like according to an example embodiment may be included in the power supply unit 1120 supplying operating power to the light emitting devices 1141. Thus, the light source module 1140 may be stably protected even in an abnormal case in which, for example, a ripple component is contained in direct current power obtained by rectifying and filtering alternating current power input through the socket 1110, direct current power is suddenly increased, and the like. In addition, a cost of a circuit may be reduced by using a lower number of switching elements included in a current control circuit.

Figure 11:
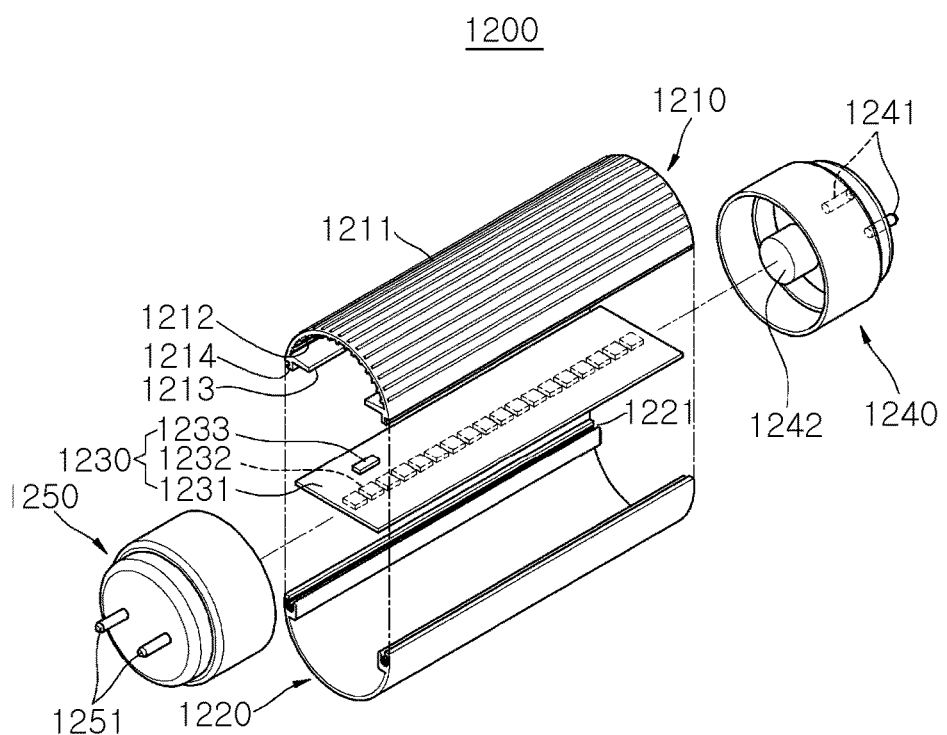
FIG. 11 is an exploded perspective view schematically illustrating a bar-type lamp as a lighting apparatus to which an LED driving apparatus according to example embodiments may be applied.

FIG. 11 is an exploded perspective view schematically illustrating a bar-type lamp as a lighting apparatus to which an LED driving apparatus according to example embodiments may be applied.

In detail, a lighting apparatus 1200 may include a heat sink member 1210, a cover 1213, a light source module 1230, a first socket 1240, and a second socket 1250. A plurality of heat radiating fins 1211 and 1212 may be formed on an internal or/and external surface of the heat sink member 1210 in a concave-convex form, and the heat radiating fins 1211 and 1212 may be designed to have various shapes and gaps therebetween. A support portion 1213 having a protrusion form may be formed on an inner side of the heat sink member 1210. The light source module 1230 may be fixed to the support portion 1213. A stop protrusion 1214 may be formed on both ends of the heat sink member 1210.

A stop groove 1221 may be formed on the cover 1213. The stop groove 1221 may be coupled to the stop protrusion 1214 of the heat sink member 1210 in a hook coupling structure. Positions in which the stop groove 1221 and the stop protrusion 1214 are formed may be interchangeable.

The light source module 1230 may include a light emitting device array. The light source module 1230 may include a printed circuit board 1231, a light source 1232, and a controller 1233. As described above, the controller 1233 may store driving information of the light source 1232. The printed circuit board 1231 may be provided with circuit wirings formed, for operating the light source 1232, and may also include constituent elements for operating the light source 1232.

The first and second sockets 1240 and 1250 may be provided as a pair of sockets, and may have a structure in which they are coupled to both ends of a cylindrical cover unit configured of the heat sink member 1210 and the cover 1213. For example, the first socket 1240 may include electrode terminals 1241 and a power supply device 1242, and the second socket 1250 may include dummy terminals 1251 disposed thereon. In addition, an optical sensor and/or a communications module may be disposed inside one of the first socket 1240 and the second socket 1250. For example, the optical sensor and/or the communications module may be installed within the second socket 1250 in which the dummy terminals 1251 are disposed. In another example, an optical sensor and/or a communications module may be installed within the first socket 1240 in whichh the electrode terminals 1241** are disposed.

Any one of the LED driving apparatus according to example embodiments may be provided as the power supply device 1242. For example, in a manner similar to the example embodiment of FIG. 10, a current control circuit, a protective circuit, and the like according to an example embodiment may be included in the power supply unit 1242. Thus, the light source module 1230 may be stably protected even in an abnormal state in which, for example, a ripple component is contained in direct current power obtained by rectifying and filtering alternating current power input through the socket 1250, direct current power is suddenly increased, and the like. In addition, a cost of a circuit may be reduced by using a substantially lower number of switching elements included in a current control circuit.

Figure 12:
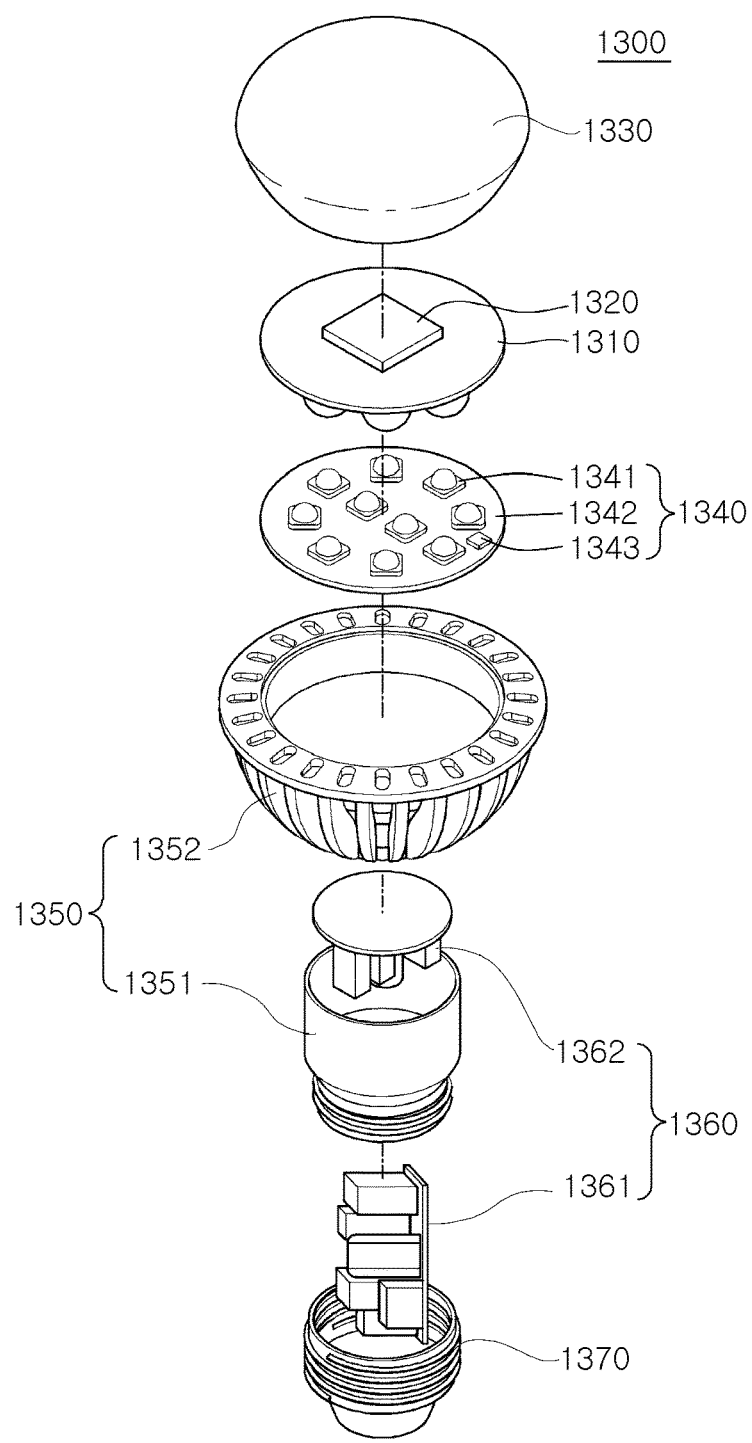
FIG. 12 is a schematic exploded perspective view of a lamp including a communications module, to which an LED driving apparatus according to example embodiments may be applied.

FIG. 12 is a schematic exploded perspective view of a lamp, including a communications module, to which an LED driving apparatus according to example embodiments may be applied.

A lighting apparatus 1300 according to an example embodiment may be different from the lighting apparatus 1100 described with reference to FIG. 10 in that a reflective plate 1310 is provided above a light source module 1340, and the reflective plate 1310 may uniformly spread light from a light source in a lateral and/or rearward direction to reduce a glare effect of light.

A communications module 1320 may be mounted on an upper portion of the reflective plate 1310, and home-network communications may be implemented through the communications module 1320. For example, the communications module 1320 may be a wireless communications module using Zigbee®, wireless fidelity (Wi-Fi), or light fidelity (Li-Fi), and may control illumination of a lighting apparatus installed indoors or outdoors, such as switching on/off, adjustment of brightness, or the like, through a smartphone or a wireless controller. In addition, electronic products in the home or outdoors and vehicle systems, such as television (TV) sets, refrigerators, air conditioners, door locks, vehicles, or the like, may be controlled using a Li-Fi communications module that uses a visible light wavelength of a lighting apparatus installed indoors or outdoors.

The reflective plate 1310 and the communications module 1320 may be covered by a cover unit 1330. A socket 1370 may be replaceable with that of an existing lighting apparatus. Power supplied to the lighting apparatus 1300 may be applied through the socket 1170. As illustrated in FIG. 10, a power supply unit 1360 may include a first power supply portion 1361 and a second power supply portion 1362 that are separated from or coupled to each other. A heat sink 1350 may include an internal radiation portion 1351 and an external radiation portion 1352. The internal radiation portion 1351 may be directly connected to a light source module 1340 and/or the power supply unit 1360, by which heat may be transferred to the external radiation portion 1352. In addition, any one of the LED driving apparatuses according to example embodiments may be applied to the lighting apparatus 1300 of FIG. 12.

Figure 13:
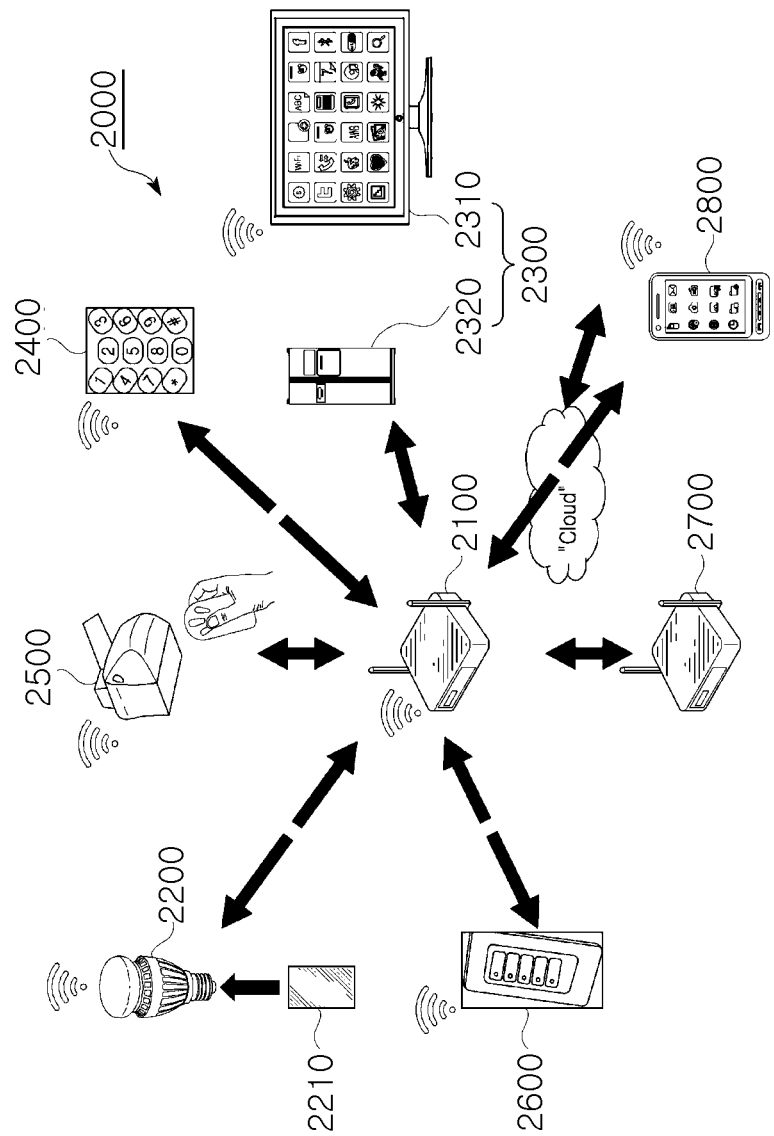
FIGS. 13 to 15 are schematic views illustrating lighting control network systems to which an LED driving apparatus according to example embodiments may be applied.
Figure 14:
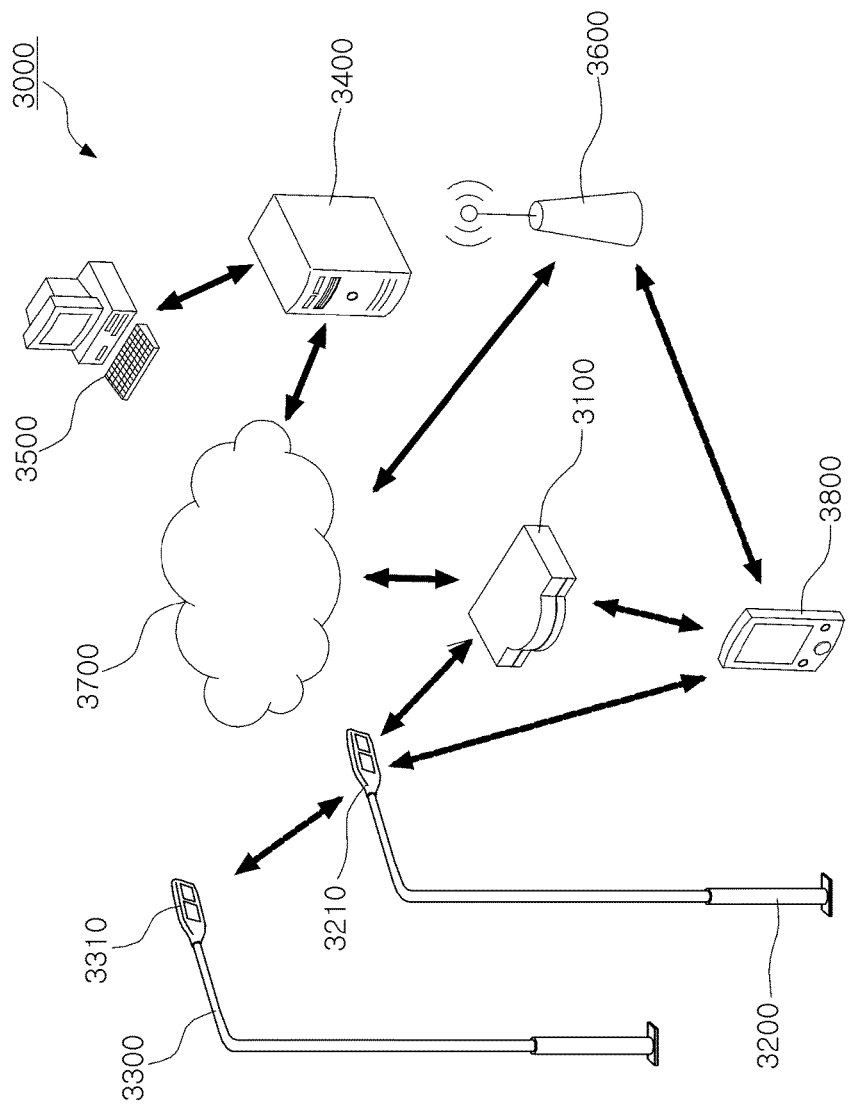
Figure 15:
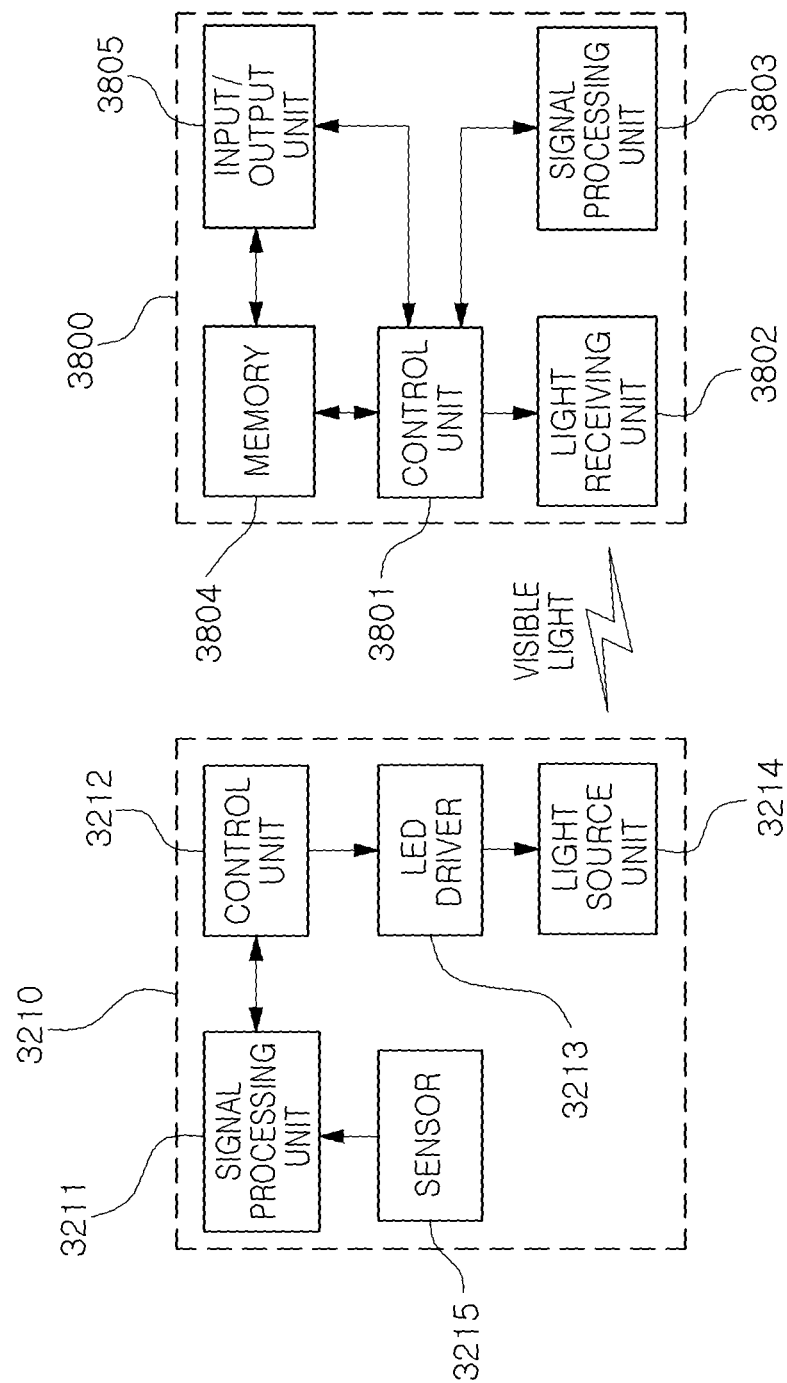

FIGS. 13 to 15 are schematic views illustrating a lighting control network system to which an LED driving apparatus according to example embodiments may be applied.

FIG. 13 is a schematic view illustrating an indoor lighting control network system.

A network system 2000 according to an example embodiment may be a composite smart lighting-network system in which lighting technology using a light emitting device such as an LED and the like, Internet-of-Things (IoT) technology, wireless communications technology, and the like converge with one another. The network system 2000 may be implemented using various lighting apparatuses and wired and/or wireless communications devices, and may be implemented by a sensor, a controller, a communications device, a software for network control and maintenance, or the like.

The network system 2000 may be applied to open spaces such as parks, roads, and the like as well as closed spaces such as inside of a building, homes or offices. The network system 2000 may be implemented based on an Internet of Things environment to collect and process various information and provide a user with the information. In this case, an LED lamp 2200 included in the network system 2000 may receive information regarding an ambient environment from a gateway 2100 to control illumination of the LED lamp 2200, and may also perform a function of identifying and controlling an operating state of other devices 2300 to 2800 included in the Internet of Things environment, or the like, by using visible light communications of the LED lamp 2200 or the like.

With reference to FIG. 13, the network system 2000 may include the gateway 2100 processing data transmitted and received according to different communications protocols, the LED lamp 2200 connected to the gateway 2100 to communicate therewith and including an LED light emitting device, and the plurality of devices 2300 to 2800 communicatively connected to the gateway 2100 according to various wireless communications schemes. To implement the network system 2000 based on an Internet of Things environment, the respective devices 2300 to 2800 as well as the LED lamp 2200 may include at least one communications module. In an example embodiment, the LED lamp 2200 may be connectively connected to the gateway 2100 by a wireless communications protocol such as Wi-Fi, Zigbee®, Li-Fi, or the like, and to this end, may include at least one communications module 2210.

As illustrated above with reference to FIG. 13, the network system 2000 may be applied to an open space such as roads or parks as well as a closed space such as homes or offices. For example, when the network system 2000 is applied to a home, the plurality of devices 2300 to 2800 included in the network system 2000 and connectively connected to the gateway 2100 based on an Internet of Things technology may include home appliances 2300 such as a television set 2310 or a refrigerator 2320, a digital door lock 2400, a garage door lock 2400, a printer 2500, a light switch 2600 installed on a wall or the like, a router 2700 for a wireless communications network relay, and a mobile device 2800 such as a smartphone, a tablet personal computer (PC), a laptop computer, and the like.

In the network system 2000, the LED lamp 2200 may identify an operating state of various devices 2300 to 2800 by using a wireless communications network installed in a home, such as Zigbee®, Wi-Fi, Li-Fi, or the like, or may automatically control illumination intensity of the LED lamp 2200 according to ambient environment and condition. In addition, the devices 2300 to 2800 included in the network system 2000 may be controlled by using Li-Fi communications that use visible rays of light emitted from the LED lamp 2200.

The LED lamp 2200 may automatically control illumination intensity thereof based on ambient environmental information transferred from the gateway 2100 through the communications module 2210 or ambient environmental information collected by a sensor installed in the LED lamp 2200. For example, the brightness of the LED lamp 2200 may be automatically adjusted according to a type of program that is broadcast on the television set 2310 or the brightness of a screen. To this end, the LED lamp 2200 may receive information regarding operation of the television set 2310 from the communications module 2210 connected to the gateway 2100. The communications module 2210 may be modularized with a sensor and/or a controller included in the LED lamp 2200.

For example, when a broadcast TV program is a drama, illumination may have a preset color temperature of 11300 K or less. For example, a color temperature may be reduced to 5000 K, and a level of color intensity may be adjusted accordingly to provide a cozy atmosphere. In addition, for example, when a broadcast program is a comedy, the network system 2000 may be configured in such a way that a color temperature may be increased to 5000 K or higher according to a preset illumination intensity value to provide blue-based white illumination.

In addition, when a predetermined time elapses after the digital door lock 2400 is locked in a state in which no person is in a home, all of the turned-on LED lamps 2200 may be turned off to thus reduce electrical consumption. Alternatively, in a case in which a security mode is preset through the mobile device 2800 or the like and the digital door lock 2400 is locked in a state in which no person is in a home, the LED lamp 2200 may also be maintained to be in a turned-on state.

An operation of the LED lamp 2200 may also be controlled according to ambient environmental information collected through various sensors connected to the network system 2000. For example, when the network system 2000 is implemented in a building, by combining a lighting apparatus, a position sensor, and a communications module in the building to collect information on position of a person in the building, the lighting apparatus may be turned on or off based on the collected information or the collected information may be provided in real time. Therefore, management of equipment or an idle space in the building may be efficiently performed. Since lighting apparatuses such as the LED lamp 2200 are generally disposed in the majority of spaces of respective floors in the building, various information regarding the building may be collected through a sensor integrated with the LED lamp 2200, and the collected information may be used for management of facilities and application of idle spaces thereto, and the like.

The LED lamp 2200, an image sensor, a storage device, the communications module 2210, and the like may be combined with one another to be used in an apparatus capable of maintaining the security of a building or sensing and dealing with emergencies. For example, when a smoke or temperature sensor or the like is attached to the LED lamp 2200, a damage to the building may be substantially reduced by quickly sensing whether a fire or the like has occurred. In addition, the brightness of a lighting apparatus may be controlled in consideration of weather or a degree of sunlight, and the like, thereby providing a comfortable illumination environment.

Any one of the LED driving apparatuses according to example embodiments may be applied to the LED lamp 2200. For example, when a plurality of LED lamps 2200 are included in the network system 2000, the LED lamps 2200 may be integrally controlled by a single LED driving apparatus according to an exemplary embodiment. The LED lamps 2200 having different light emission characteristics may be actively and integrally controlled, and power efficiency may be improved by applying protective parameters corresponding to respective characteristics of the respective lamps 2200.

As described above, the network system 2000 may be applied to open spaces such as parks, roads, and the like as well as closed spaces defined as the inside of a building, homes, and offices. For example, when the network system 2000 is applied to open spaces without physical limitation, the network system 2000 may be relatively difficult to be implemented therein due to distance limitation of wireless communications, communications interference by various obstacles, and the like. In this case, by installing a sensor, a communications module, and the like on a respective lighting apparatus and using the respective lighting apparatus as an information collection device and a communications repeater, the network system 2000 may be efficiently implemented in open environments as above more, which will be described in more detail with reference to FIG. 14 below.

FIG. 14 illustrates an example embodiment of a network system 3000 applied to an open space. With reference to FIG. 14, the network system 3000 according to the example embodiment may include a communications connection device 3100, a plurality of lighting fixtures 3200 and 3300 installed within a predetermined distance therebetween and communicatively connected to the communications connection device 3100, a server 3400, a computer 3500 to manage the server 3400, a communications base station 3600, a communications network 3700 connecting the communications devices to each other, a mobile device 3800, and the like.

The plurality of lighting fixtures 3200 and 3300 installed in open external spaces such as roads or parks may include smart engines 3210 and 3310, respectively. The smart engines 3210 and 3310 may respectively include a light emitting device emitting light, a driver driving the light emitting device, a sensor collecting information regarding an ambient environment, a communications module, and the like. The smart engines 3210 and 3310 may communicate with other devices according to a communications protocol such as Wi-Fi, Zigbee®, Li-Fi, or the like by using the communications module.

In an example embodiment, a single smart engine 3210 may be communicatively connected to another smart engine 3310. In this case, a Wi-Fi mesh may be applied to communications between the smart engines 3210 and 3310. At least one smart engine 3210 may be connected to the communications connection device 3100 that is connected to the communications network 3700, via wired and/or wireless communications. To increase communication efficiency, a plurality of smart engines 3210 and 3310 may be provided as one group and connected to a single communications connection device 3100.

The communications connection device 3100 may be provided as an access point (AP) through which wired and/or wireless communications may be carried out, and may relay communications between the communications network 3700 and other devices. The communications connection device 3100 may be connected to the communications network 3700 via at least one of wired and wireless schemes, and in an example embodiment, may be mechanically accommodated inside one of the lighting fixtures 3200 and 3300.

The communications connection device 3100 may be connected to the mobile device 3800 via a communications protocol such as Wi-Fi or the like. A user of the mobile device 3800 may receive ambient environmental information collected by the plurality of smart engines 3210 and 3310 via the communications connection device 3100 connected to the smart engine 3210 of the lighting fixture 3200 adjacent thereto. The ambient environmental information may include surrounding traffic information, weather information, and the like. The mobile device 3800 may also be connected to the communications network 3700 in a wireless cellular communications scheme of 3rd generation (3G), 4th generation (4G), or the like through the communications base station 3600.

The server 3400 connected to the communications network 3700 may receive information collected by the smart engines 3210 and 3310 installed in the lighting fixtures 3200 and 3300, respectively, and may simultaneously monitor an operating state of the respective lighting fixtures 3200 and 3300 and the like. To manage the respective lighting fixtures 3200 and 3300 based on the monitoring result of an operating state of the respective lighting fixtures 3200 and 3300, the server 3400 may be connected to the computer 3500 providing a management system. The computer 3500 may execute software and the like that may monitor and manage an operating state of the smart engines 3210 and 3310.

To transfer information collected by the smart engines 3210 and 3310 to the mobile device 3800 of a user, various communications schemes may be used. With reference to FIG. 15, information collected by the smart engines 3210 and 3310 may be transmitted to the mobile device 3800 via the communications connection device 3100 connected to the smart engines 3210 and 3310, or the smart engines 3210 and 3310, and the mobile device 3800 may be communicatively connected to each other. The smart engines 3210 and 3310 and the mobile device 3800 may directly communicate with each other by visible wireless communications (e.g., Li-Fi), and this will be described with reference to FIG. 15 below.

FIG. 15 is a block diagram illustrating a communications operation between the smart engine 3210 of the lighting fixture 3200 and the mobile device 3800 via visible light wireless communications. With reference to FIG. 15, the smart engine 3210 may include a signal processing unit 3211, a control unit 3212, an LED driver 3213, a light source unit 3214, a sensor 3215, and the like. The mobile device 3800 connected to the smart engine 3210 via visible light wireless communications may include a control unit 3801, a light receiving unit 3802, a signal processing unit 3803, a memory 3804, an input/output unit 3805, and the like.

The visible light wireless communications (e.g., Li-Fi) technology may be a wireless communications technology of transferring information in a wireless manner by using light in a visible light wavelength band, which is perceptible to the human eye. The visible light wireless communications technology may be distinguished from an existing wired optical communications technology and infrared wireless communications in that the light within a visible light wavelength band, for example, a frequency of specific visible light from a light emitting package described in the example embodiment is used. Further, the visible light wireless communications technology may also be distinguished from a wired optical communications technology in that a communications environment thereof is wireless. In addition, the visible light wireless communications technology may provide convenience in that the visible light wireless communications may be freely used without regulations or permission in terms of using a frequency, physical security is prominent, and communications links may be confirmed by a user's eye, in a manner different from radio frequency (RF) wireless communications. Furthermore, the visible light wireless communications technology has convergence technology characteristics, by which a specific purpose of a light source and a communications function may be obtained.

With reference to FIG. 15, the signal processing unit 3211 of the smart engine 3210 may process data to be transmitted and/or received by the visible light wireless communications. In an example embodiment, the signal processing unit 3211 may process information collected by the sensor 3215 as data to transmit the data to the control unit 3212. The control unit 3212 may control operations of the signal processing unit 3211, the LED driver 3213, and the like, and in detail, may control operations of the LED driver 3213 based on the data transmitted by the signal processing unit 3211. The LED driver 3213 may enable the light source unit 3214 to emit light in response to a control signal output from the control unit 3212, to thus transfer the data to the mobile device 3800.

The mobile device 3800 may include the control unit 3801, the memory 3804 storing data therein, the input/output unit 3805 that includes a display and a touchscreen, an audio output portion, and the like, the signal processing unit 3803, and the light receiving unit 3802 for recognizing visible light including data. The light receiving unit 3802 may sense the visible light and convert the sensed visible light into an electrical signal. The signal processing unit 3803 may decode data included in the electrical signal converted by the light receiving unit. The control unit 3801 may store data decoded by the signal processing unit 3803 in the memory 3804 or may output the decoded data through the input/output unit 3805 and the like so as to be perceived by a user.

The smart engine 3210 according to the example embodiments of FIGS. 14 and 15 may include any one of LED driving apparatuses according to example embodiments. With reference to FIG. 15, the control unit 3212 may correspond to a microcontroller unit in the LED driving apparatus according to an example embodiment, and the LED driver 3212 may correspond to a power supply module. For example, a visible light communications function may be exhibited while the light source unit 3214 is actively controlled and protected by a single microcontroller unit.

As set forth above, according to example embodiments, a current control circuit controlling a current in a linear control method may be connected to output terminals of a plurality of LEDs, and a protective circuit may determine operations of the current control circuit using a voltage detected by the output terminals of the plurality of LEDs. In addition, the current control circuit may be stably operated without causing a problem such as generation of heat, stress, and the like, and without increasing the number of active devices thereof. Further, a function of protection from overvoltage and a short circuit may be implemented by a single protective circuit.

At least one of the components, elements or units represented by a block as illustrated in the drawings may be embodied as various numbers of hardware, software and/or firmware structures that execute respective functions described above, according to an exemplary embodiment. For example, at least one of these components, elements or units may use a direct circuit structure, such as a memory, processing, logic, a look-up table, etc. that may execute the respective functions through controls of one or more microprocessors or other control apparatuses. Also, at least one of these components, elements or units may be specifically embodied by a module, a program, or a part of code, which contains one or more executable instructions for performing specified logic functions. Also, at least one of these components, elements or units may further include a processor such as a central processing unit (CPU) that performs the respective functions, a microprocessor, or the like. Further, although a bus is not illustrated in some of the block diagrams, communication between the components, elements or units may be performed through the bus. Functional aspects of the above exemplary embodiments may be implemented in algorithms that execute on one or more processors. Furthermore, the components, elements or units represented by a block or processing steps may employ any number of related art techniques for electronics configuration, signal processing and/or control, data processing and the like.

Although a few embodiments have been shown and described, it would be appreciated by those skilled in the art that changes may be made in the exemplary embodiments without departing from the principles and spirit of the disclosure, the scope of which is defined in the claims and their equivalents.

What is claimed is:

1. An apparatus for driving a light emitting diode (LED), the apparatus comprising:
    a current control circuit connected to an output terminal of a plurality of LEDs and configured to generate a first voltage based on a sensing voltage detected from the output terminal of the plurality of LEDs, the current control circuit comprising at least one comparator configured to control a current flowing in the plurality of LEDs based on a result of comparison between the first voltage and a reference voltage; and
    a protective circuit configured to block the current flowing in the plurality of LEDs by stopping an operation of the at least one comparator in response to an increase of the sensing voltage,
    wherein the protective circuit is configured to block the current flowing in the plurality of LEDs by stopping the operation of the at least one comparator further in response to an input voltage supplied to the plurality of LEDs being higher than a first threshold voltage.

2. The apparatus of claim 1, wherein the current control circuit is configured to adjust an average value of the current flowing in the plurality of LEDs by controlling a duty ratio of the current flowing in the plurality of LEDs based on the result of the comparison.

3. The apparatus of claim 1, wherein the current control circuit comprises:
    a voltage distribution circuit configured to generate the reference voltage;
    a switching element connected to the output terminal of the plurality of LEDs; and
    an integrating circuit configured to generate the first voltage based on the sensing voltage.

4. The apparatus of claim 3, wherein the current control circuit comprises a resistor connected between the switching element and a ground terminal.

5. The apparatus of claim 4, wherein the resistor comprises a plurality of resistors connected to each other in parallel.

6. The apparatus of claim 3, wherein the integrating circuit comprises a capacitor that is charged in response to a turn-on state of the switching element and discharged in response to a turn-off state of the switching element.

7. The apparatus of claim 3, wherein the sensing voltage is detected from an input terminal of the switching element connected to the output terminal of the plurality of LEDs.

8. The apparatus of claim 1, further comprising a regulator circuit configured to supply an operating voltage to the at least one comparator.

9. The apparatus of claim 8, wherein, in response to the increase in the sensing voltage, the regulator circuit is configured to supply a reduced level of the operating voltage to stop the operation of the at least one comparator.

10. The apparatus of claim 8, wherein the protective circuit comprises:
    a switching element connected to the regulator circuit;
    a capacitor charged by the sensing voltage; and
    a zener diode connected between a control terminal of the switching element and the capacitor.

11. The apparatus of claim 10, wherein the protective circuit is configured to draw a current flowing in the regulator circuit to the protective circuit by turning on the switching element in response to a voltage of the capacitor having a level higher than a level of a zener voltage of the zener diode.

12. The apparatus of claim 10, wherein the regulator circuit and the switching element are connected to each other in parallel.

13. The apparatus of claim 8, wherein the regulator circuit comprises a shunt regulator circuit.

14. The apparatus of claim 1, wherein the protective circuit is configured to operate the at least one comparator in response to the input voltage being lower than a second threshold voltage.

15. The apparatus of claim 14, wherein the first threshold voltage is higher than the second threshold voltage.

16. A lighting apparatus comprising:
   a light source comprising a plurality of LEDs operated by driving power supplied by an external power supply;
   a current control circuit comprising a switching element, connected to an output terminal of the plurality of LEDs, and at least one comparator configured to control an operation of the switching element, wherein the current control circuit is configured to adjust an average value of a current flowing in the plurality of LEDs by controlling a turn-on time and a turn-off time of the switching element; and
   a protective circuit configured to block the current flowing in the plurality of LEDs by stopping an operation of the at least one comparator when a sensing voltage detected from the output terminal of the plurality of LEDs is increased by an input voltage, the input voltage being higher than a first threshold voltage.

17. The lighting apparatus of claim 16, wherein the light source comprises a plurality of LED strings connected to each other in parallel, and the current control circuit comprises a plurality of switching elements, respectively connected to output terminals of the plurality of LED strings, and a plurality of comparators configured to respectively control operations of the plurality of switching elements.

18. The lighting apparatus of claim 17, wherein the plurality of comparators respectively control an average value of a current flowing in each of the plurality of LED strings, independently of each other.

19. A current control circuit comprising:
   a switching element connected to an output terminal of a plurality of LEDs;
   an integrating circuit connected between the switching element and a ground terminal; and
   at least one comparator configured to control a current flowing in the plurality of LEDs by performing an operation of comparison between a voltage output from the integrating circuit and a reference voltage, and configured to stop performing the operation of the comparison in response to an increase of the current flowing in the plurality of LEDs,
   wherein the at least one comparator is configured to control an average value of the current flowing in the plurality of LEDs by controlling an operation of the switching element based on the comparison between the voltage output from the integrating circuit and the reference voltage, and
   wherein the at least one comparator is further configured to stop performing the operation of the comparison between the voltage output from the integrating circuit and the reference voltage further in response to an input voltage supplied to the plurality of LEDs being higher than a first threshold voltage.

* * * * *